United States Patent Office
2,919,480
Patented Jan. 5, 1960

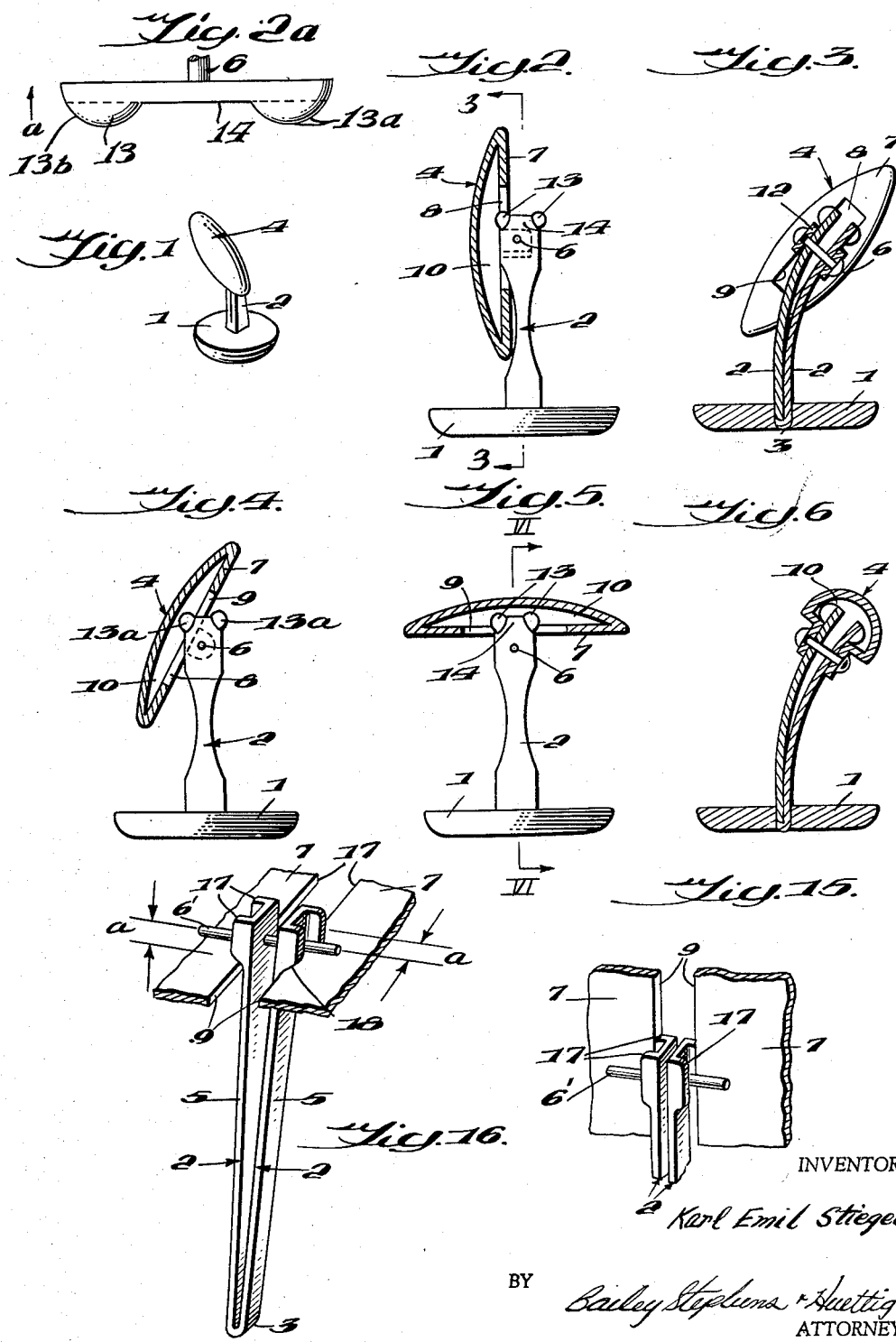

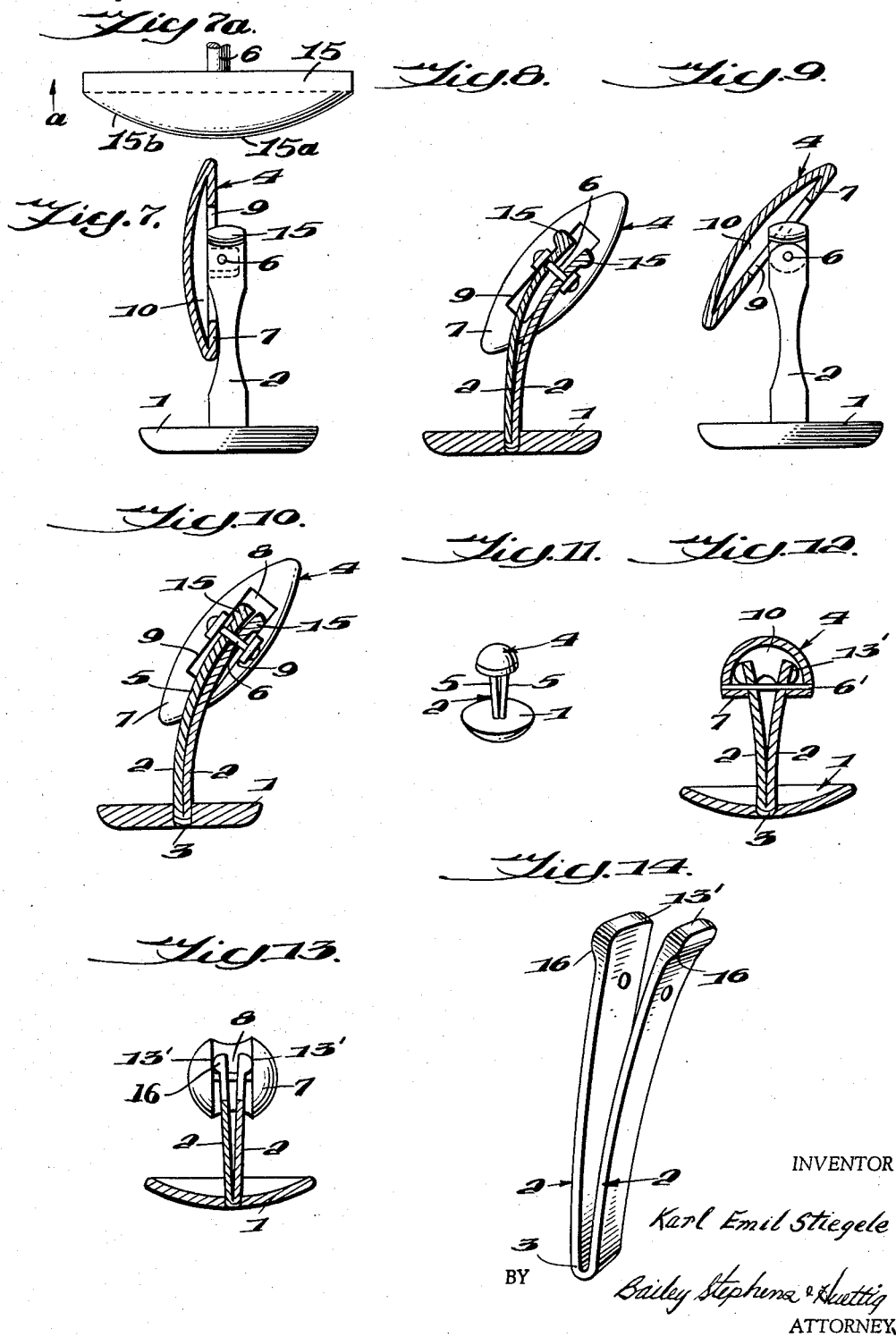

2,919,480

CUFF- AND COLLAR-BUTTON

Karl Emil Stiegele, Huchenfeld, near Pforzheim, Germany

Application April 8, 1957, Serial No. 651,526

Claims priority, application Germany April 21, 1956

6 Claims. (Cl. 24—97)

The invention relates to cuff and collar buttons, and particularly to such buttons in which the head is resiliently pivoted about a fixed axis on a stem fixed to the base.

In previously known collar and cuff buttons, the assembly of the pivoted button on the stem was simplified by a resilient construction of the stem. The pivoting of the head was accomplished by the use of at least one leaf spring, against which usually a flat side of the square end of the stem of a polygonal member arranged on a pivot rested, so that the pivoted head was resiliently mounted. The head remains in position against the strength of the leaf spring until it is turned to the next flat side of the polygonal member, so that the spring is displaced when it passes over the edge between two adjacent flat sides.

These known arrangements for resilient mounting of the heads on fixed hinges have several disadvantages. Relatively great skill is necessary for assembling the leaf springs properly in the heads. The leaf springs must be of small dimensions, and easily become fatigued or even break. Besides, in the known arrangements, provision is often made for replacing the springs, which requires even greater skill in assembly and makes the devices more expensive. These earlier devices have the further disadvantage that, as soon as the spring has lost a slight amount of its original resiliency, the head can move through a considerable angle before any noticeable spring action takes place.

The present invention has the object of overcoming the disadvantages of these prior devices by the elimination of the leaf spring and the cooperating polygonal member so as to produce a more economical device, whose head is also resiliently pivoted about a fixed axis.

This is accomplished according to the invention by providing in the pivoted head a cavity accessible through an opening bounded by parallel side edges, the cavity being of greater breadth in the direction of the pivot axis than the width of the opening. The legs of the stem are resiliently pressed apart and the ends are provided with projections on the outside which project into the cavity when the head is in the normal position (transverse to the stem). The turning of the head then produces a compression of the resilient legs into the opening. In this way, the natural resiliency of the bifurcated stem is used to maintain the pivoted head in fixed angular positions and to resist resiliently oppositely directed turning motions. No leaf springs are then required. Also the interchangeability of the leaf spring provided for in the prior art is unnecessary. According to the invention, the bifurcated stem with its two outwardly presssed legs can be so firmly connected even to very small bases that the stresses on the stem upon compression of its resilient legs are very small and thereby fatigue or breaking of the resilient parts is not likely.

Preferably the head, which is of any desired shape, is in the form of a shell provided with a base plate facing the stem, in which an opening is provided. In this way, the pivoted head can include extensions bent at right angles to the base plate containing holes on an axis perpendicular to the parallel side walls of the opening, through which extends a bearing pin. It is also desirable to arrange the pivot axis for the head inside the shell.

It is further advantageous to construct the stem of a single piece of resilient material bent upon itself in hairpin form, and to secure the bight in the case, by welding or pressing. The movable ends of the legs of the stem are provided near their free ends with holes for the pivot axis of the head. It is also desirable that the pivoted head be held fairly firmly in its normal position, that is, when it is transverse to the longitudinal axis of the stem. This is accomplished according to the invention by providing on the outside of the ends of the legs projections with slanted edges which in this normal position of the head with respect to the stem engage, within the recess, the upper faces of the parallel side edges of the opening.

In order to facilitate the pivoting of the head, the ribs or projections can be rounded so that they can easily enter the opening in the head. If a plurality of positions of the head is desired, then the projections are interrupted by notches, so that the legs can expand in several different positions of the head and the head will be resiliently held in intermediate positions. By varying the depth of the notches, and by selection of the shape and the degree of rounding of the edges of the projections, it is possible to vary the resiliency with which the head is held in given positions. For example, if a collar button is desired in which for swinging the head from its 90° position (parallel to the stem) only a slight force is required, the projections are so constructed that in this position only a very small part of the rounded edges protrudes into the narrow opening. For a cuff button, it may be desirable that in this position a considerable resilient force should act on the head. Through a suitable arrangement of the pivot or construction of the ribs, it is easy to provide that the head can be strongly held in this position so that a considerable force is required to return the head, which has been pivoted through 90°, to its normal position. The amount of this force depends on the form and the size of the edges of the ribs which enter the opening.

Further objects and advantages of the invention will appear more fully from the following description, particularly when taken in conjunction with the accompanying drawings which all form a part thereof.

In the drawings:

Fig. 1 is a perspective view of a cuff button embodying the invention;

Fig. 2 is a side view of the article of Fig. 1 showing the head at its 90° position, with the head in section;

Fig. 2a is an enlarged top plan view of one of the legs;

Fig. 3 is a cross-section on the line 3—3 of Fig. 2;

Fig. 4 is a view similar to Fig. 2 showing the head in an intermediate position;

Fig. 5 is a similar view showing the head in normal position;

Fig. 6 is a cross-section on the line 6—6 of Fig. 5.

Fig. 7 is a view similar to Fig. 2 of a modified form of cuff button embodying the invention;

Fig. 7a is an enlarged top plan view of one of the legs of Fig. 7;

Fig. 8 is a view similar to Fig. 3 of the modification of Fig. 7;

Fig. 9 is a view similar to Fig. 7 showing the head in an intermediate position;

Fig. 10 is a side view of Fig. 9, showing the stem in section;

Fig. 11 shows in perspective a collar button embodying the invention;

Fig. 12 is a cross-section through the collar button of Fig. 11 with the head in normal position;

Fig. 13 is a view of the device of Fig. 11, with the head tilted and the stem in section;

Fig. 14 is a perspective view of a stem which can be used in the arrangement of Figs. 11 to 13;

Fig. 15 shows in perspective a detail of a further modification with the head in 90° position; and Fig. 16 is a view similar to Fig. 15 with the head in normal position.

According to the arrangement of Figs. 1 to 6, the base 1, of any suitable shape, has secured in it the stem 2. This stem is formed of a single piece of resilient metal bent into hairpin shape, the bight 3 being pressed into an opening in the base 1 and secured therein by soldering or welding if desired. The head 4, which may be of any desired shape, is pivoted at 6 near the upper end of the legs 2. The pivoted head 4 is preferably formed as a shell, for example of sheet metal or other sheet material. Its bottom wall 7 is provided with an opening 8, which has parallel side walls 9 arranged in planes perpendicular to the axis of pivot 6. The recess 10 within the shell is of greater width, at least in the direction of pivot axis 6, than the space between the side walls 9 of the opening.

On the ends of the resilient legs 2 adjacent opening 8 projections or ribs are provided. These are so positioned that, when the head is turned from the position shown in Fig. 5 to that of Fig. 2, or vice versa, the edges 9 engage the projections which are formed on the outside of the legs and thus force the legs toward each other. The resiliency of the legs then acts to resist the turning of the head from one position to another and holds it resiliently in the selected position.

In the form of the invention shown in Figs. 1 to 6, the pivot 6 is outside the head 4. The bottom wall 7 of the head has downwardly bent projections 12 at right angles to the wall, along the opposite parallel edges of the opening 8. The pivot pin 6 passes through these projections and through corresponding openings in the legs 2, so that the head is pivoted on a fixed pivot with respect to the legs. This construction allows the head to swing to the 90° position shown in Fig. 2. The projections referred to above in the form of Figs. 1 to 6 are shown at 13, the projecting portion on each leg being divided into two parts by an intermediate notch 14. Thus, as shown in Fig. 2a, the projection has intermediate parts 13a and, outside these parts, outer ends 13b sloping inwardly in the direction of arrow a. In this way, when the head is swung from the position shown in Fig. 5 to that shown in Fig. 4, the right hand projection will move out of the head, while the left hand projection 13 remains within the head.

When the edges 9 come opposite the notch 14, the legs can spring apart and will then hold the head resiliently in the intermediate position of edge 9. Further swinging of the head to the position shown in Fig. 5 moves the left hand projections at least partially out of the opening, where they will act to hold the head in the 90° position shown in Fig. 2. The projections 13 are rounded or slanted so that they will have a camming action causing the legs to flex inwardly when the head is turned.

In the form of the invention shown in Figs. 1 to 6, the size and shape of the projections is such that, in the position shown in Fig. 2, they are only slightly more than half way out of the opening, so that the legs are partially expanded, and it requires relatively little force to return the head apart from this position to the position of Fig. 4. On the other hand, when the parts are in the position shown in Fig. 5, the projections engage the inner face of the bottom wall 7 along the parallel side walls 9 of the opening and hold the head fairly firmly in that position.

In the arrangement of Figs. 7 to 10, the construction is generally the same. However, the projections 15 in this form are in the shape of a tapered roll with no intermediate notch. This arrangement does not allow for holding the head firmly in an intermediate position, but the head is held either in the position of Fig. 7 or in the normal transverse position. As the head moves into the position of Fig. 9, it compresses the legs which expand apart when the position of Fig. 7 or the normal position is reached. Here, the projection has an intermediate part 15a and outside such part outer ends 15b sloping inwardly in the direction of arrow a. In either of these positions, the head is held quite firmly.

Figs. 11 to 13 show a collar button constructed in general in the same manner as in Figs. 1 to 6, except that the projections 13' do not have any notches and that the axis 6' is inside the head. The lower edges of these projections 13' are rounded, as at 16. When the head is moved into the 90° position, these projections are engaged between and engage frictionally the parallel side walls of the opening in the head so that relatively little force is needed to restore the head to the normal position, whereas a substantial force is necessary to remove it from that position since the projections are completely inside the head.

In the form of Figs. 15 and 16, the stem is formed of resilient sheet metal bent into hairpin shape and the projections are formed by portions 17 bent outwardly at right angles to the planes of the legs. The horizontal distance a between the pivot 6' and plane of the wall of the projection 17 is equal to the vertical distance a between the pivot and the bottom wall 7. Thus, when the head is in the 90° position, as shown in Fig. 15, the inner edges 9 of the opening will engage directly against the outer edges of projection 17, and the head will be held in this position by friction only. On the other hand, when the head is moved from the normal position of Fig. 16, it must compress the legs together, by engagement with the lower rounded edges 18 of the projections 17.

It will be noted that in the form of Figs. 11 to 16 the pivot is inside the head, which for reasons of appearance may be desirable.

While I have described herein some embodiments of my invention, I wish it to be understood that I do not intend to limit myself thereby except within the scope of the claims hereto or hereinafter appended.

I claim:

1. A removable button comprising a base, a stem having two substantially parallel legs the lower ends of which are secured in the base and the upper ends of which are resiliently urged apart, a hollow head comprising a sheet metal shell having a bottom wall constituting its lower face and having a recess therein with an opening in the lower face, said opening having parallel side walls having length and said recess being wider than said opening in a direction perpendicular to the length of said side walls, a pivot pin extending through said legs and engaged in said head for pivoting the head on the legs to turn about a fixed axis perpendicular to the length of said side walls, said legs being movable relative to the pin, said legs having projections on their outer sides at a greater distance from the base than said pivot pin adjacent the lower face of the head engageable by the parallel side walls when the head is turned about its pivot, whereby turning of the head about its pivot is resiliently resisted, said projections lying inside the recess in the hollow head when the head is in transverse position with respect to the legs said projections each including at least one intermediate part and having inwardly sloping outer ends outside each such intermediate part, whereby, when the head is tilted relative to the stem, the parallel side walls of the opening engage such inwardly sloping ends of the projections to hold the head resiliently in tilted position.

2. A device as claimed in claim 1, said shell having extensions adjacent the parallel side walls of the opening perpendicular to the plane of the lower face of the head, said pin passing through said extensions and said legs.

3. A device as claimed in claim 1, in which the axis of said pivot pin means is inside the shell.

4. A device as claimed in claim 1, in which said stem is composed of a single resilient member having its legs united at its lower end, said lower end being secured in the base.

5. A device as claimed in claim 1, in which said projections have inclined edges.

6. A device as claimed in claim 1, in which the parallel side walls of the opening have edges, and two spaced projections are provided on each leg with a notch therebetween, in which the edges of the side walls can engage to hold the head in slanted position with respect to the stem.

References Cited in the file of this patent

UNITED STATES PATENTS

| | | |
|---|---|---|
| 370,489 | Mitchell | Sept. 27, 1887 |

FOREIGN PATENTS

| | | |
|---|---|---|
| 29,529 | Germany | Nov. 22, 1884 |
| 334,027 | France | Oct. 8, 1903 |